June 13, 1950  J. O. H. FREDHOLM ET AL  2,511,106
GAS-FILLED CAVITY RESONATOR
Filed March 29, 1946
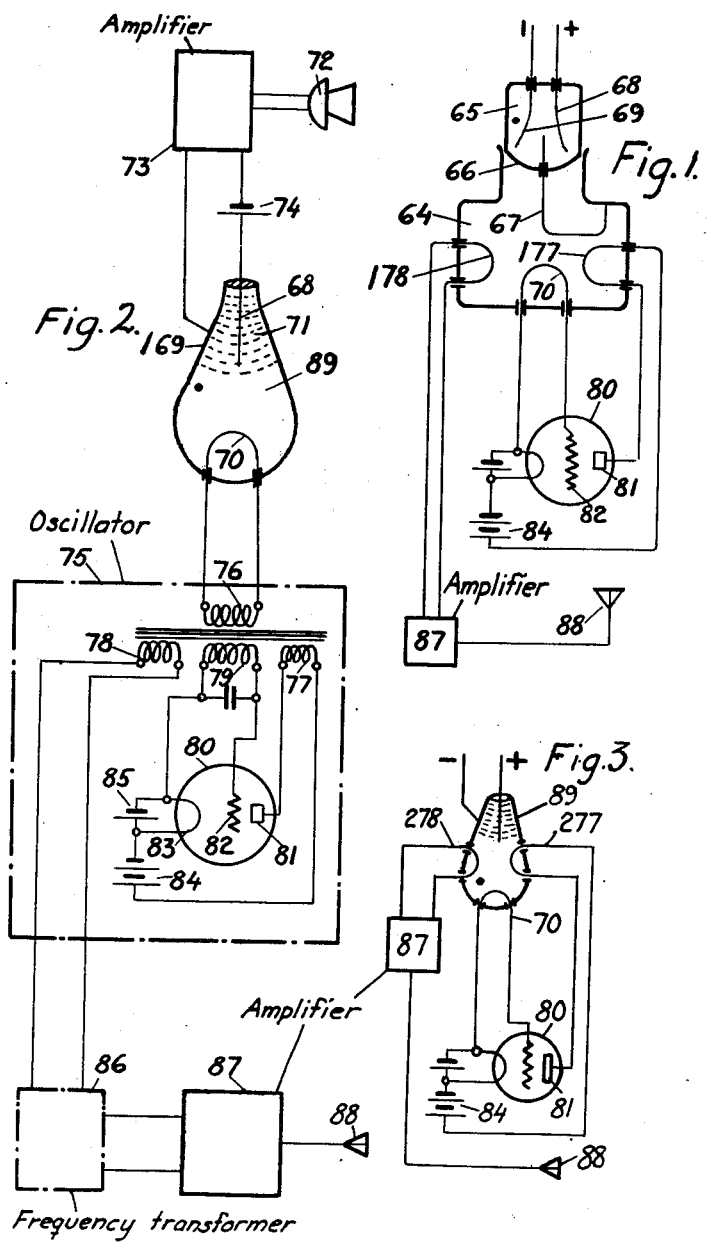
Johan Olof Helge Fredholm
Per Harry Elias Claesson
INVENTORS Patented June 13, 1950

2,511,106

UNITED STATES PATENT OFFICE 2,511,106

GAS-FILLED CAVITY RESONATOR

Johan Olof Helge Fredholm, Alsten, and Per Harry Elias Claesson, Jakobsberg, Sweden Application March 29, 1946, Serial No. 657,984
In Sweden May 7, 1942

4 Claims. (Cl. 332—29)

The present invention relates generally to the variation of volume of hollow conductors for the conduction of ultrashort electromagnetic waves, and particularly to a device for the variation of the resonant frequency of a cavity resonator.

The present specification is a continuation-in-part of our copending application for Letters Patent Serial No. 511,522; J. O. H. Fredholm and P. H. E. Claesson, Device for frequency modulation of the resonant frequency of a cavity resonator, filed November 24, 1943, now Patent No. 2,436,640, issued Feb. 24, 1948.

One object of the present invention is to provide a device for periodic changes of the frequency modulation of the resonance frequency of cavity resonators, for example in connection with electron tubes comprising one or more cavity resonators.

The increase and decrease of the volume of a hollow conductor or cavity can according to the present invention be accomplished by ionizing a gas within the conductor or cavity by impressing a variable potential on at least two electrodes in contact with the gas, whereby the active volume of non-ionized gas for oscillations or for the transmission of ultrahigh electromagnetic waves can be increased or decreased in step with the variations of the impressed potential.

The invention is particularly suitable for the frequency modulation of ultrashort radio waves in transmitters, for example for television, telephony and similar purposes, when it is desired in a simple manner to frequency modulate the transmitted wave.

According to the present invention it is possible in a single operation to cause a greater change of frequency than what has been possible heretobefore.

The cavity resonator to be frequency modulated can be of the rhumbatron type and may form part of a velocity modulated tube.

The present invention and its operating is further described in connection with the accompanying drawings, of which:

Fig. 1 diagrammatically shows a cavity resonator and an adjacent cavity, provided with an ionizable gas and two electrodes.

Fig. 2 diagrammatically shows a gas-filled cavity resonator provided with electrodes for the ionization of the gas and provided with coupling elements for taking energy from the cavity resonator for a frequency modulated radio transmitter, for example for television, telephony and the like.

Fig. 3 shows another embodiment of the device.

In Fig. 1 a cavity resonator 64 is coupled to an adjacent cavity 65, from which it is separated by a glass partition 66. The cavity 65 is filled with an ionizable gas, for example neon. Through the electrodes 68 and 69 a direct current potential is admitted, which potential, if sufficiently high, causes a glimmering light between the electrodes, which can be parallel or slightly diverging. When a lower potential is impressed, the glimmering light is shown between the electrodes only close to the wall, where the electrodes pass through the same, and the gas encountered therebetween is ionized; if the potential is increased, the glimmering light is increased towards the ends of the electrodes and more gas is ionized, whereby the gas will be electrically conducting.

By periodically varying the direct current potential or in other way varying the same between certain maximum and minimum values, the active volume of the cavity can according to this device be increased and decreased in step with the impressed potential. The ionized part of the gas volume acts as an electric short-circuit to oscillations existing within the cavity so that the remaining, not ionized gas volume in the cavity will vary in step with the impressed potential.

Oscillations are transferred from the cavity resonator 64 to the cavity 65 by means of the conductor 67. Energy is taken from the cavity resonator 64 by means of a loop 70. The cavity resonator 64 does not need to be air tight, because the gasfilled cavity 65, which can be air tight, is in a suitable way coupled to the cavity resonator 64. Loop 177 is coupled between anode 81 and the anode battery 84, and loop 178 is coupled to amplifier 87. 88 is an antenna for transmitting into space.

The triode 80 is connected in a three-point coupling oscillator with loops 70 and 177 in the resonator 64, which basic frequency is modulated by variations of the input voltage to the gasfilled chamber 65 through the loop 67. Modulated energy is taken out by loop 178 and is then radiated into space by an antenna 88.

Fig. 2 diagrammatically shows the connections of a frequency modulated radio transmitter, for example for television, telephony or other purposes, whereby the principle of frequency modulation according to Fig. 1 is used, but with the difference that a single cavity resonator is utilized.

A microphone or an image transmitter 73 in series with the direct current source 74 to the electrode 68 and the metal shell 169 of the cavity resonator 89, which is hermetically sealed and filled with an ionizable gas. Energy is taken out through the loop 70, by means of which the cavity resonator is coupled to the oscillator 75. The primary winding 76 of a transformer is connected to the said loop 70. The transformer is provided with three secondary windings 77–79, of which the winding 79 is coupled to the cathode 83, battery 85 and grid 82 of the triode 80, while the winding 77 is coupled to the anode 81 and the anode battery 84. The winding 78 serves as energy output from the oscillator 75 and is coupled via a frequency transformer 86 and the amplifier 87 to the transmitting antenna 88. The cavity resonator 89 can be located in a thermostat in order to keep the basic frequency of the cavity resonator constant.

The cavity resonator can have any desired form, for example of rhumbatron type, and can be provided with devices to increase and to decrease the volume of the cavity resonator in order to obtain a sharp adjustment of the basic average frequency.

The device operates in the following way. Speech or image signals through the microphone or through the image transmitter 72 will cause the border line between the ionized gas volume 71 and the rest of the volume of the cavity resonator 89 to vary in step with the speech or with the television currents.

The basic frequency of the oscillator 75 which normally has a fairly flat resonance curve will be kept constant by means of the coupling between the loop 70 of the cavity resonator 89 and the oscillator 75. The average frequency resonator directs the oscillator in such a way that its basic frequency is kept constant. The cavity resonator 89 thus takes the place of the crystal in crystal-governed oscillators or transmitters. Crystal governed transmitters, however, do not admit frequency modulation, because the basic frequency of the crystal cannot be varied.

Stabilisation as well as modulation of the basic frequency can thus be accomplished by means of a single cavity resonator which is of extraordinary importance and a simplification of the devices that heretobefore have been used for television, telephony and the like.

In Fig. 3, which shows another embodiment of the device shown in Fig. 2, cavity resonator 89 is provided with two extra loops 277 and 278. A triode 80 is coupled in oscillator coupling between the loops 70 and 277, and energy is taken out by loop 278.

The device operates in similar way as described in Fig. 2.

The resonator 64, Fig. 1, or 89, Fig. 2 can be tuned to one of the harmonics of the oscillator 80 resp. 75. If thus the resonator oscillates about the said harmonic, the basic frequency of the oscillator will follow, because the resonator and the oscillator are automatically closely coupled. In this way we can obtain the advantage that the resonator can be made with a relatively small volume and can thus be more easily handled.

What we claim is:

1. A cavity having a shell of good conductivity, an ionizable gas in said cavity, two electrodes associated with said cavity and in contact with said gas, a potential source coupled to said electrodes for ionization of part of said gas, one part of said gas being non-ionized and the other part being ionized so that the conducting border-layer between the ionized and the non-ionized part of the gas together with the conducting shell, which contacts the non-ionized part of the gas, form a cavity resonator for the conduction of ultrashort electromagnetic waves, means for varying the potential of said potential source for the ionization of such parts of said gas in step with a desired variation of the applied potential that the resonant frequency of said cavity resonator is modulated in step with the variation of the volume of the said cavity resonator.

2. In combination, an oscillator for the generation of electromagnetic waves, a cavity resonator coupled to said oscillator, said cavity resonator comprising a cavity having a shell of good conductivity, and ionizable gas in said activity, two electrodes associated with said cavity and in contact with said gas, a potential source coupled to said electrodes for ionization of part of said gas, one part of said gas being non-ionized and the other part being ionized so that the conducting border layer between the ionized and the non-ionized part of the gas together with the part of the conducting shell, which contacts the non-ionized part of the gas, form a cavity resonator for the conduction of ultrashort electromagnetic waves, means for varying the potential of said potential source for the ionization of such parts of said gas in step with a desired variation of the applied potential that the resonant frequency of said cavity resonator and thus that of the oscillator is modulated in step with the variation of the volume of the said cavity resonator.

3. In combination, an oscillator for the generation of electromagnetic waves, a cavity resonator coupled to said oscillator, said cavity resonator having a shell of good conductivity, an ionizable gas in said cavity, two electrodes associated with said cavity and in contact with said gas, a direct current source and an alternating current source coupled to said electrodes for ionization of part of said gas, one part of said gas being non-ionized and the other part being ionized so that the conducting border layer between the ionized and the non-ionized part of the gas together with the part of the conducting shell, which contacts the non-ionized part of the gas, form a cavity resonator for the conduction of ultrashort electromagnetic waves, means for varying the potential of said potential source for the ionization of such parts of said gas in step with a desired variation of the applied potential that the resonant frequency of said cavity resonator and thus that of the oscillator is modulated in step with the variation of the volume of the said cavity resonator.

4. In combination, an oscillator for the generation of electromagnetic waves, a cavity resonator coupled to said oscillator, said cavity resonator having a shell of good conductivity, an ionizable gas in said cavity, two electrodes associated with said cavity and in contact with said gas, a direct voltage source coupled to said electrodes, a transmitter coupled to said direct voltage source and to said electrodes for modulating the voltage applied to said electrodes, one part of said gas being non-ionized and the other part being ionized so that the conducting border layer between the ionized and the non-ionized part of the gas together with the part of the conducting shell, which contacts the non-ionized part of the gas form a cavity resonator for the conduction of ultrashort electromagnetic waves, means for varying the potential of said potential source for the ionization of such parts of said gas in step with a desired variation of the applied potenial that the resonant frequency of said cavity resonator and thus that of the oscillator is modulated in step with the variation of the volume of the said cavity resonator.

JOHAN OLOF HELGE FREDHOLM.
PER HARRY ELIAS CLAESSON.

REFERENCES CITED

The following references are of record in the file of this patent:

UNITED STATES PATENTS

| Number | Name | Date |
|---|---|---|
| 2,241,976 | Blewett et al. | May 13, 1941 |
| 2,308,523 | Llewellyn | Jan. 19, 1943 |
| 2,374,810 | Fremlin | May 1, 1945 |

FOREIGN PATENTS

| Number | Country | Date |
|---|---|---|
| 148,955 | Great Britain | Dec. 12, 1921 |
| 571,225 | Great Britain | Aug. 13, 1945 |